United States Patent
Usuki (10) Patent No.: US 11,176,378 B2
(45) Date of Patent: Nov. 16, 2021

(54) IMAGE PROCESSING DEVICE, IMAGE PROCESSING METHOD, PROGRAM, AND RECORDING MEDIUM

(71) Applicant: FUJIFILM Corporation, Tokyo (JP)

(72) Inventor: Masaya Usuki, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 152 days.

(21) Appl. No.: 16/564,179

(22) Filed: Sep. 9, 2019

(65) Prior Publication Data

US 2020/0104600 A1 Apr. 2, 2020

(30) Foreign Application Priority Data

Sep. 28, 2018 (JP) .............................. JP2018-184349

(51) Int. Cl.
 *G06K 9/00* (2006.01)
 *G06F 16/51* (2019.01)
 *G06F 16/58* (2019.01)

(52) U.S. Cl.
 CPC ......... *G06K 9/00684* (2013.01); *G06F 16/51* (2019.01); *G06F 16/5866* (2019.01)

(58) Field of Classification Search
 CPC ............ G06K 9/00684; G06K 9/00664; G06F 16/51; G06F 16/5866; G06F 16/583
 See application file for complete search history.

(56) References Cited

U.S. PATENT DOCUMENTS

| | | |
|---|---|---|
| 2011/0200980 A1 | 8/2011 | Takahashi et al. |
| 2013/0179172 A1 | 7/2013 | Nakamura et al. |
| 2013/0304743 A1 | 11/2013 | Kurokawa |
| 2017/0083795 A1* | 3/2017 | Ono .................... G06K 9/00677 |
| 2017/0091594 A1 | 3/2017 | Yano |
| 2017/0193009 A1* | 7/2017 | Rapantzikos ......... G06F 16/335 |

(Continued)

FOREIGN PATENT DOCUMENTS

| | | | |
|---|---|---|---|
| JP | 2001076120 A | * | 3/2001 |
| JP | 2009-157460 A | | 7/2009 |

(Continued)

OTHER PUBLICATIONS

An Office Action dated by the Japanese Patent Office dated Oct. 5, 2021, which corresponds to Japanese Patent Application No. 2018-184349 and is related to U.S. Appl. No. 16/564,179; with English language translation.

*Primary Examiner* — Chan S Park
*Assistant Examiner* — Daniel C Chang
(74) *Attorney, Agent, or Firm* — Studebaker & Brackett PC (57) ABSTRACT

An image receiving unit receives an input of an image set owned by a first user, an image analyzing unit analyzes each image included in the image set, a tag information setting unit sets tag information items to be assigned to each image based on an analyzing result of each image, and a tag information assigning unit assigns, as main tag information, the tag information, among the tag information items to be assigned to the image, for which a ratio of the number of times of appearances of the tag information to be assigned to the image to the total number of times of appearances of all the tag information items to be assigned to all the images included in the image set is equal to or greater than a first threshold value and is equal to or less than a second threshold value, to the image, for each image.

18 Claims, 4 Drawing Sheets

(56) References Cited

U.S. PATENT DOCUMENTS

| | | | | |
|---|---|---|---|---|
| 2018/0337994 | A1* | 11/2018 | Dachille | H04L 67/1097 |
| 2019/0065855 | A1* | 2/2019 | Lerman | G06T 19/006 |
| 2019/0180101 | A1* | 6/2019 | Li | G06K 9/6267 |
| 2019/0370593 | A1* | 12/2019 | Nakao | G06T 5/50 |

FOREIGN PATENT DOCUMENTS

| | | | | | |
|---|---|---|---|---|---|
| JP | 2010-250635 | A | | 11/2010 | |
| JP | 2012-155524 | A | | 8/2012 | |
| JP | 2013-140520 | A | | 7/2013 | |
| JP | 2017-059101 | A | | 3/2017 | |
| JP | 2017-068434 | A | | 4/2017 | |
| JP | 2018018428 | A | * | 2/2018 | |
| KR | 20160142163 | A | * | 12/2016 | G06F 3/0482 |
| WO | 2010/047337 | A1 | | 4/2010 | |

\* cited by examiner

IMAGE PROCESSING DEVICE, IMAGE PROCESSING METHOD, PROGRAM, AND RECORDING MEDIUM

CROSS-REFERENCE TO RELATED APPLICATIONS

The present application claims priority under 35 U.S.C. § 119 to Japanese Patent Application No. 2018-184349, filed on Sep. 28, 2018. The above application(s) is hereby expressly incorporated by reference, in its entirety, into the present application.

BACKGROUND OF THE INVENTION

1. Field of the Invention

The present invention relates to an image processing device, an image processing method, a non-transitory computer recording medium storing a program, and a recording medium that assign tag information to each image included in an image set.

2. Description of the Related Art

An image owned by a user is published to any user who uses a social networking service (SNS) or is shared with only a sharing partner by using the SNS. In this case, tag information may be assigned to each image. The tag information is used for searching for and displaying a desired image from an image set and is used as information indicating contents of the image in association with the image.

The tag information can be automatically assigned by a program such as the SNS or can be manually assigned by each user according to a subject appearing in each image. One or more tag information items can be assigned to each image.

For example, tag information items such as "vehicle", "train", and "4000 series train" are assigned to an image in which a train appears. For example, in a case where a girl unexpectedly appears in the image in which the train appears, tag information items such as "person", "child", and "girl" are assigned. As stated above, various tag information items may be assigned to each image according to the subject appearing in the image regardless of an importance of the subject.

Here, the related arts related to the present invention include JP2017-059101A, JP2017-068434A, and JP2010-250635A.

JP2017-059101A describes that an image is obtain and analyzed, tag information is assigned to the image based on analyzing result, an assignment rate of common tag information in images owned by a plurality of users is calculated as a first assignment rate, an assignment rate of the common tag information in the image owned by each user is calculated as a second assignment rate, and ranking of the common tag information assigned to the image owned by each user is determined based on a difference between the first assignment rate and the second assignment rate of the common tag information.

JP2017-068434A describes that a master-slave relation value in a case where a master-slave relation between two subjects is determined and the subjects have a relation in which a first subject is a slave and a second subject is a master is calculated as a value larger than a master-slave relation value in a case where the subjects have not relation in which the first subject is the slave and the second subject is the master, a smaller master-slave relation value is calculated as the number of subjects, among the plurality of subjects, which use the first subject as the slave becomes larger, and a subject evaluation value is calculated for each subject based on the master-slave relation value.

JP2010-250635A describes that image data is obtained and is stored in a memory, a plurality of feature values is obtained from the image data stored in the memory, and an importance in each feature value is determined. JP2010-250635A describes that a histogram is created, a frequency of a value is obtained, and the value having a high frequency is determined as a value having high importance in a case where a feature value is a feature value capable of being obtained as a numerical value, as a determining procedure of the importance.

SUMMARY OF THE INVENTION

In recent years, smartphones have come into wide use. The number of users who display browse a list of image sets published or shared in the SNS on a display of the smartphone has increased. However, a display region of the display of the smartphone is relatively narrow, and thus, it may be difficult to display all tag information items assigned to each image included in the list of images on the display in association with the image.

In a case where the image set is displayed, it is necessary to display tag information appropriate to each image according to contents of the image set. For example, in a case where the user narrows down images in which trains appear among the image set and displays the images, the user knows that the trains appear in all the images. In this case, it is desirable that tag information of "4000 series train" is displayed instead of displaying tag information of "train".

As stated above, in the related art, various tag information items can be assigned to the image according to the subject appearing in the image. However, in a case where the image included in the image set is displayed, the user cannot display the appropriate tag information in association with each image.

Accordingly, an object of the present invention is to provide an image processing device, an image processing method, a non-transitory computer recording medium storing a program, and a recording medium which are capable of displaying tag information appropriate to each image in association with each image in a case where a list of images included in an image set is displayed.

In order to achieve the object, the present invention provides an image processing device comprising an image receiving unit that receives an input of an image set owned by a first user, an image analyzing unit that analyzes each image included in the image set, a tag information setting unit that sets tag information items to be assigned to each image based on analyzing result of each image, and a tag information assigning unit that assigns, as main tag information, the tag information, among the tag information items to be assigned to the image, for which a ratio of the number of times of appearances of the tag information to be assigned to the image to the total number of times of appearances of all the tag information items to be assigned to all the images included in the image set is equal to or greater than a first threshold value and is equal to or less than a second threshold value, to the image, for each image.

Here, it is preferable that the tag information setting unit sets, as the tag information items to be assigned to the image, two or more tag information items which have different abstraction degrees, among a plurality of tag information items which is included in the same category and has different abstraction degrees, for each image, and the tag information assigning unit assigns, as the main tag information, tag information, among the two or more tag information items which are to be assigned to the image and have different abstraction degrees, for which the ratio is equal to or greater than the first threshold value and is equal to or less than the second threshold value, to the image.

It is preferable that the image processing device further comprises an abstraction degree setting unit that sets abstraction degrees of the tag information items assigned to each image based on the tag information items assigned to the images included in the image set. It is preferable that in a case where first tag information and second tag information are tag information items included in the same category and the second tag information is assigned to the image to which the first tag information is assigned and the first tag information is not assigned to the image to which the second tag information is assigned is equal to or greater than a threshold value, the abstraction degree setting unit may perform setting such that the abstraction degrees of the first tag information and the second tag information are different and the abstraction degree of the second tag information is higher than the abstraction degree of the first tag information. It is preferable that the tag information setting unit sets the tag information items to be assigned to each image by using the tag information items which are assigned to the images included in the image set and for which the abstraction degrees are set, as the plurality of tag information items having different abstraction degrees.

It is preferable that in a case where there are two or more tag information items, among the tag information items to be assigned to the image, for which the ratio is equal to or greater than the first threshold value and is equal to or less than the second threshold value, the tag information assigning unit assigns, as the main tag information, the two or more tag information items for which the ratio is equal to or greater than the first threshold value and is equal to or less than the second threshold value, to the image, for each image.

It is preferable that in a case where there are two or more tag information items, among the tag information items to be assigned to the image, for which the ratio is equal to or greater than the first threshold value and is equal to or less than the second threshold value, the tag information assigning unit assigns, as the main tag information, only the tag information, of the two or more tag information items for which the ratio is equal to or greater than the first threshold value and is equal to or less than the second threshold value, of which the abstraction degree is the maximum, to the image, for each image.

It is preferable that in a case where there are two or more tag information items, among the tag information items to be assigned to the image, for which the ratio is equal to or greater than the first threshold value and is equal to or less than the second threshold value, the tag information assigning unit assigns, as the main tag information, only the tag information, of the two or more tag information items for which the ratio is equal to or greater than the first threshold value and is equal to or less than the second threshold value, of which the abstraction degree is the minimum, to the image, for each image.

It is preferable that in a case where there is no tag information, among the tag information items to be assigned to the image, for which the ratio is equal to or greater than the first threshold value and is equal to or less than the second threshold value, the tag information assigning unit assigns, as the main tag information, only the tag information, among the tag information items for which the ratio is less than the first threshold value, of which the ratio is the maximum, to the image, for each image.

It is preferable that the image processing device further comprises an image narrowing-down unit that narrows down the images included in the image set to an image group matching a narrowing-down condition according to a command to set the narrowing-down condition of the images. It is preferable that the tag information assigning unit assigns, as the main tag information, the tag information, among the tag information items to be assigned to the image, for which a ratio of the number of times of appearances of the tag information to be assigned to the image to the total number of times of appearances of all the tag information items to be assigned to all the images included in the image group is equal to or greater than a third threshold value and is equal to or less than a fourth threshold value, to the image, for each image included in the image group.

It is preferable that the image receiving unit receives an input of a new image owned by the first user, and adds the new image to the image set, the image analyzing unit analyzes the new image, the tag information setting unit sets tag information items to be assigned to the new image based on an analyzing result of the new image, and the tag information assigning unit assigns, as the main tag information, the tag information, among the tag information items to be assigned to the image, for which the ratio is equal to or greater than the first threshold value and is equal to or less than the second threshold value, to the image, for each image included in the image set including the new image.

It is preferable that the image processing device further comprises an image sharing unit that shares an image between the first user and the second user. It is preferable that in a case where an image owned by the second user is shared with the first user, the image receiving unit adds the shared image as the image set owned by the first user.

It is preferable that the image processing device further comprises an image display unit that displays at least a part of the images included in the image set on a display. It is preferable that the image display unit displays the main tag information assigned to the image displayed on the display in association with the image displayed on the display.

It is preferable that the tag information setting unit sets, as the tag information items to be assigned to each image, tag information indicating an emotion of a person appearing in each image.

It is preferable that the tag information setting unit sets, as the tag information items to be assigned to each image, tag information indicating an emotion of a person who captures each image according to a command to set an emotion of a photographer.

It is preferable that the tag information assigning unit assigns tag information, among the tag information items to be assigned to the image, which is other than the tag information assigned as the main tag information to the image, to the image, for each image.

The present invention provides an image processing method comprising receiving, by an image receiving unit, an input of an image set owned by a first user, analyzing, by an image analyzing unit, each image included in the image set, setting, by a tag information setting unit, tag information items to be assigned to each image based on an analyzing result of each image, and assigning, by a tag information assigning unit, as main tag information, tag information, among the tag information items to be assigned to the image, for which a ratio of the number of times of appearances of the tag information to be assigned to the image to the total number of times of appearances of all the tag information items to be assigned to all the images included in the image set is equal to or greater than a first threshold value and is equal to or less than a second threshold value, to the image, for each image.

Here, it is preferable that two or more tag information items which have different abstraction, among a plurality of tag information items which is included in the same category and has different abstraction degrees are set as the tag information items to be assigned to the image for each image, and the tag information, of the two or more tag information items which are to be assigned to the image and have different abstraction degrees, for which the ratio is equal to or greater than the first threshold value and is equal to or less than the second threshold value, is assigned as the main tag information to the image.

It is preferable that the image processing method further comprises narrowing down, by an image narrowing-down unit, the images included in the image set to an image group matching a narrowing-down condition according to a command to set the narrowing-down condition of the images. It is preferable that the tag information, among the tag information items to be assigned to the image, for which a ratio of the number of times of appearances of the tag information to be assigned to the image to the total number of times of appearances of all the tag information items to be assigned to all the images included in the image group is equal to or greater than a third threshold value and is equal to or less than a fourth threshold value, is assigned as the main tag information to the image, for each image included in the image group.

It is preferable that the image processing method further comprises receiving, by the image receiving unit, an input of a new image owned by the first user, and adding the new image to the image set, analyzing, by the image analyzing unit, the new image, and setting, by the tag information setting unit, tag information items to be assigned to the new image based on an analyzing result of the new image. It is preferable that the tag information, among the tag information items to be assigned to the image, for which the ratio is equal to or greater than the first threshold value and is equal to or less than the second threshold value, is assigned as the main tag information to the image, for each image included in the image set including the new image.

It is preferable that the image processing method further comprises displaying, by an image display unit, at least a part of the images included in the image set on a display. It is preferable that the main tag information assigned to the image displayed on the display is displayed in association with the image displayed on the display.

The present invention provides a non-transitory computer recording medium storing a program causing a computer to execute the steps of any of the image processing methods.

The present invention provides a computer-readable recording medium having a program causing a computer to execute the steps of any of the image processing methods recorded thereon.

The present invention provides an image processing device comprising an image receiving unit that receives an input of an image set owned by a first user, an image analyzing unit that analyzes each image included in the image set, a tag information setting unit that sets tag information items to be assigned to each image based on analyzing result of each image, and a tag information assigning unit that assigns, as main tag information, the tag information, among the tag information items to be assigned to the image, for which a ratio of the number of times of appearances of the tag information to be assigned to the image to the total number of times of appearances of all the tag information items to be assigned to all the images included in the image set is equal to or greater than a first threshold value and is equal to or less than a second threshold value, to the image, for each image. The image receiving unit, the image analyzing unit, the tag information setting unit, and the tag information assigning unit are constituted by dedicated hardware or processors that execute program.

It is preferable that the image processing device further comprises an abstraction degree setting unit that sets abstraction degrees of the tag information items assigned to each image based on the tag information items assigned to the images included in the image set. It is preferable that in a case where first tag information and second tag information are tag information items included in the same category and the second tag information is assigned to the image to which the first tag information is assigned and the first tag information is not assigned to the image to which the second tag information is assigned is equal to or greater than a threshold value, the abstraction degree setting unit performs setting such that the abstraction degrees of the first tag information and the second tag information are different and the abstraction degree of the second tag information is higher than the abstraction degree of the first tag information. It is preferable that the tag information setting unit sets the tag information items to be assigned to each image by using the tag information items which are assigned to the images included in the image set and for which the abstraction degrees are set, as the plurality of tag information items having different abstraction degrees. It is preferable that the abstraction degree setting unit is constituted by dedicated hardware or a processor that executes a program.

It is preferable that the image processing device further comprises an image narrowing-down unit that narrows down the images included in the image set to an image group matching a narrowing-down condition according to a command to set the narrowing-down condition of the images. It is preferable that the tag information assigning unit assigns, as the main tag information, the tag information, among the tag information items to be assigned to the image, for which a ratio of the number of times of appearances of the tag information to be assigned to the image to the total number of times of appearances of all the tag information items to be assigned to all the images included in the image group is equal to or greater than a third threshold value and is equal to or less than a fourth threshold value, to the image, for each image included in the image group. It is preferable that the image narrowing-down unit is constituted by dedicated hardware or a processor that executes a program.

It is preferable that the image processing device further comprises an image sharing unit that shares an image between the first user and the second user. It is preferable that in a case where an image owned by the second user is shared with the first user, the image receiving unit adds the shared image as the image set owned by the first user. It is preferable that the image sharing unit is constituted by dedicated hardware or a processor that executes a program.

It is preferable that the image processing device further comprises an image display unit that displays at least a part of the images included in the image set on a display. It is preferable that the image display unit displays the main tag information assigned to the image displayed on the display in association with the image displayed on the display. It is preferable that the image display unit is constituted by dedicated hardware or a processor that executes a program.

According to the present invention, it is possible to assign the main tag information having a high necessity for the first user to the image by assigning, as the main tag information, the tag information, among the tag information items to be assigned to the image, for which the ratio is equal to or greater than the first threshold value and is equal to or less than the second threshold value, to the image, for each image included in the image set owned by the first user. It is possible to assign the main tag information having an appropriate abstraction degree to each image included in the image set in the image set owned by the first user for each image by setting, as the tag information items to be assigned to the image, two or more tag information items which have different abstraction degrees, among the plurality of tag information items which are included in the same category and have different abstraction degrees.

DESCRIPTION OF THE PREFERRED EMBODIMENTS

Hereinafter, an image processing device, an image processing method, a program, and a recording medium according to an embodiment of the present invention will be described in detail based on preferred embodiments shown in the accompanying drawings.

Figure 1:
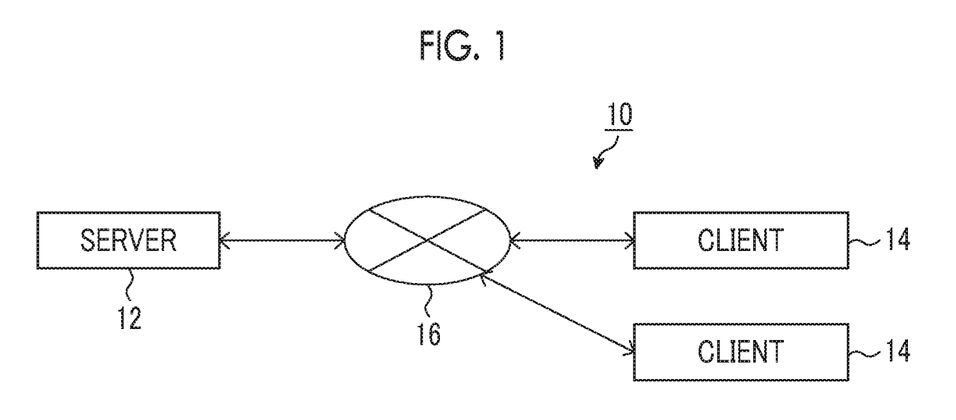
FIG. 1 is a block diagram of an embodiment showing a configuration of an image processing system according to an embodiment of the present invention.

FIG. 1 is a block diagram of an embodiment showing a configuration of an image processing system according to the embodiment of the present invention. An image processing system 10 shown in FIG. 1 comprises a server 12, and a plurality of clients 14 connected to the server 12 via a network 16.

The server 12 has a function of obtaining image sets owned by a plurality of users who uses the image processing system 10 and setting each image included in the image set owned by each of the plurality of users so as to publish each image to any user, so as to publish each image to only a sharing partner, or so as not to publish each image to the public. The number of servers 12 is not limited to one, but a plurality of servers may be used. The server is a workstation including a control device, a storage device, and a communication device.

The client 14 is an image processing device according to the present embodiment, and has a function of assigning tag information to each image included in the image set owned by the user. The client 14 is a desktop personal computer (PC), a laptop PC, a tablet PC, or a portable terminal such as a portable phone and a smartphone that includes a control device, an input device, a storage device, a communication device, and a display.

Figure 2:
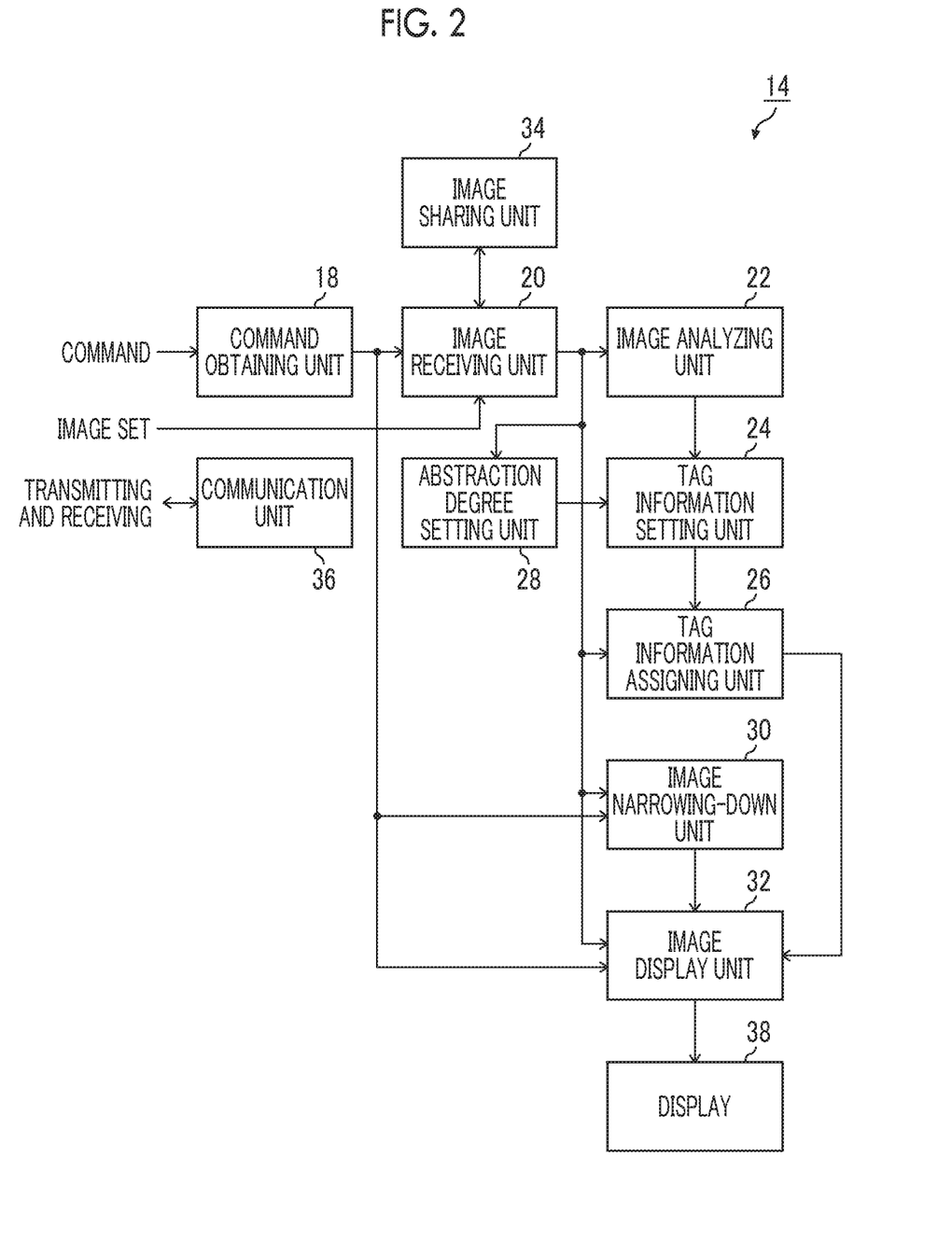
FIG. 2 is a block diagram of an embodiment showing a configuration of a client.

FIG. 2 is a block diagram of an embodiment showing a configuration of the client. The client 14 shown in FIG. 2 comprises a command obtaining unit 18, an image receiving unit 20, an image analyzing unit 22, a tag information setting unit 24, a tag information assigning unit 26, an abstraction degree setting unit 28, an image narrowing-down unit 30, an image display unit 32, an image sharing unit 34, a communication unit 36, and a display 38.

Hereinafter, the client 14 owned by a first user will be described. The first user is any one user of all users who use the image processing system 10. The user indicates a person who uses one account in the image processing system 10, and normally corresponds to one natural person. However, the user may be two or more natural persons at the time of sharing one account in a family. In the present embodiment, although the client 14 of the first user will be described, the client 14 owned by another user other than the first user has the same configuration and function.

In the client 14 of the first user, the command obtaining unit 18 initially obtains various commands input from the first user by using an input device such as a keyboard, a mouse, or a touch panel.

The first user inputs a command by using the input device while viewing a screen displayed on the display 38. The command input by the first user is not particularly limited, but the command includes a command to designate the image set, a command to select an emotion of a photographer, a command to select a threshold value, a command to set a narrowing-down condition of images, a command to display an image, a command to select an image from images included in the image set, a command to set a sharing partner of images, and a command to set the image so as to publish the image to the public, so as to share the image, or so as not to publish the image to the public.

Subsequently, the image receiving unit 20 receives an input of the image set owned by the first user according to the command to designate the image set. In other words, the image receiving unit 20 obtains the image group owned by the first user.

The image set owned by the first user is not particularly limited, but an image set stored in the storage device of the client 14 of the first user, an image set recorded in an external recording medium such as a universal serial bus (USB) memory, a secure digital (SD) memory, a compact disc (CD), a digital versatile disc (DVD), and a hard disk (HD), an image set stored in an online storage, and an image set posted to an SNS are included in the image set. The image includes a still image and a motion picture.

Accessory information such as attribute information and tag information can be assigned to each image included in the image set.

The attribute information is information indicating an attribute of the image, and can be, for example, an exchangeable image file format (Exif). The Exif information is information regarding an imaging condition of the image, and includes, for example, information such as an imaging date and time of the image, an imaging location (positional information), a focal length, or exposure. The Exif information is assigned as header information of the image (image data) captured by a digital camera.

The tag information is a name indicating the attribute information of the image, a subject (a person and an object other than the person) appearing in the image, and a scene, an event, and an emotion read from the image. For example, in a case where an imaging year of the image is 2018, the tag information of "2018" is assigned to the image. In a case where the imaging location of the image is Tokyo, the tag information of "Tokyo" is assigned to the image. In a case where "meat" and a plurality of "persons" appear as the subjects in the image, the tag information items of "meat", "person", "get-together", and "girl-only gathering" are assigned to the image. In a case where "person" appearing in the image has a smile, the tag information items of "smile" and "enjoy" are assigned to the image. The emotion can be measured by measuring and detecting a heart rate, a respiration rate, a blood pressure, an electrocardiogram, a body temperature, and sweating by a wearable terminal, and by measuring and detecting a degree of opening of the pupil by a goggle type terminal. The tag information can be automatically assigned based on an analyzing result of the image by the tag information assigning unit 26 to be described below or can be manually assigned to the image by the first user.

Subsequently, the image analyzing unit 22 analyzes each image included in the image set owned by the first user.

The image analysis is not particularly limited, but includes brightness determination, color evaluation, blur evaluation, analysis of attribute information, subject recognition for recognizing the subject appearing in the image, scene recognition (night view, sea, sandy beach, sky, . . . ), and event detection (sports meeting, wedding ceremony, graduation ceremony, . . . ). The subject recognition includes face detection, person recognition (face recognition), and object recognition (meat, fruit, flower, or cake).

Subsequently, the tag information setting unit 24 sets the tag information items to be assigned to each image based on the analyzing result of each image.

The tag information setting unit 24 can set, as the tag information items to be assigned to each image, the attribute information of each image, the subject appearing in each image, the scene or event of each image, and the tag information indicating the emotion of the person appearing in each image. The tag information setting unit 24 can set, as the tag information items to be assigned to each image, the tag information indicating the emotion of the person who captures each image according to the command to set the emotion of the photographer.

Subsequently, the tag information assigning unit 26 assigns, as main tag information, the tag information, among the tag information items to be assigned to the image set by the tag information setting unit 24, for which a ratio (an assignment rate of the tag information in the image set) of the number of times of appearances of the tag information to be assigned to the image to the total number of times of appearances of all the tag information items to be assigned to all the images included in the image set is equal to or greater than a first threshold value and is equal to or less than a second threshold value, to the image, for each image included in the image set. The tag information assigning unit 26 may assign, to the image, tag information, among the tag information items to be assigned to the image, which is other than the tag information assigned as the main tag information to the image, for each image.

In a case where the image is displayed on the display 38, the main tag information is tag information to be displayed in association with the image. For example, all the tag information items which include the main tag information and are assigned to the image can be used as a narrowing-down condition at the time of narrowing down the image.

As stated above, a display region of a display of a smartphone is relatively narrow, and thus, it may be difficult to display all the tag information items assigned to the image in association with the image on the display. In contrast, only the main tag information of the image in association with the image is displayed, and thus, it is possible to display the tag information items so as to be easier to see even in a case where the display region of the display is narrow compared to a case where all the tag information items are displayed.

Figure 3:
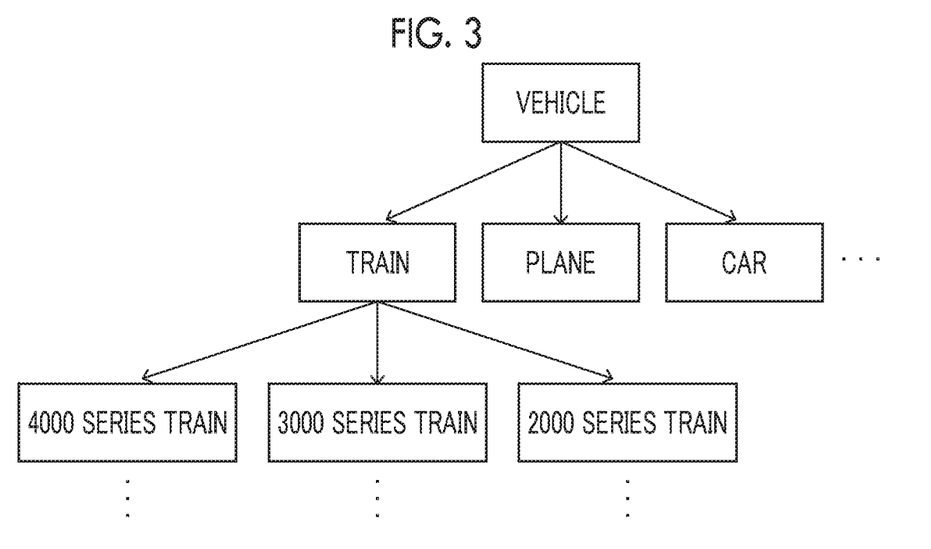
FIG. 3 is a conceptual diagram of an embodiment showing tag information included in a category of "vehicle".

For example, a category of the tag information indicates a range in which the tag information items having the same feature are included, such as "vehicle", "food", and "drink". For example, tag information items such as "train", "plane", and "car" are included in the category of the tag information of "vehicle", as shown in FIG. 3. For example, tag information items such as "4000 train", "series 3000 series train", and "2000 series train" are included in the category of the tag information of "train".

An abstraction degree of the tag information indicates a degree to which the tag information is expressed as a higher-level concept. For example, in a case where the category of the tag information is "vehicle", abstraction degrees of the tag information items of "vehicle", "train", and "4000 series train" are respectively a large value, a medium value, and a small value. In other words, the tag information items of "vehicle", "train", and "4000 series train" are respectively tag information items of a higher-level concept, a middle-level concept, and a lower-level concept, and have a hierarchical relation (inclusion relation).

The first threshold value and the second threshold value are respectively a lower limit value and an upper limit value of the ratio. The first threshold value and the second threshold value are values set in advance in the image processing system 10, and may be fixed values such as 20% and 50%, or may be variable values according to the image set. Alternatively, the first threshold value and the second threshold value may be set according to the command to set the threshold value. For example, the first user can set the first threshold value and the second threshold value by using a slider bar. The same is true of a threshold value, a third threshold value, and a fourth threshold value to be described below.

Subsequently, the abstraction degree setting unit 28 sets the abstraction degree of the tag information assigned to each image based on the tag information assigned to the image included in the image set.

For example, in the image processing system 10, even though a plurality of tag information items having different abstraction degrees is not prepared in advance for each category, in a case where the tag information is already assigned to each image included in the image set received by the image receiving unit, the abstraction degree setting unit 28 can set the abstraction degree of the tag information assigned to each image, that is, the hierarchical relation of the tag information based on the tag information already assigned to each image included in the image set.

For example, it is considered that the tag information of "vehicle" is assigned to the image to which the tag information of "train" is assigned with high frequency. Meanwhile, the tag information of "train" may not be necessarily assigned to the image to which the tag information of "vehicle" is assigned, and the tag information items of "plane" and "car" may be assigned. In a case where there are many such situations, the abstraction degree of the tag information of "vehicle" may be higher than the abstraction degree of the tag information of "train".

Accordingly, in a case where the first tag information and the second tag information are the tag information items included in the same category and a case where the second tag information is assigned to the image to which the first tag information is assigned and the first tag information is not assigned to the image to which the second tag information is assigned is equal to or greater than a threshold value, the abstraction degree setting unit 28 sets that the abstraction degrees of the first tag information and the second tag information are different and the abstraction degree of the second tag information is higher than the abstraction degree of the first tag information. In this case, the tag information setting unit 24 can set the tag information items to be assigned to each image by using, as a plurality of tag information items, the tag information which is assigned to the image included in the image set and to which the abstraction degree is set by the abstraction degree setting unit 28.

Subsequently, the image narrowing-down unit 30 narrows down the images included in the image set to an image group matching to the narrowing-down condition according to the command to set the narrowing-down condition of the image. The narrowing-down condition includes any keyword, tag information, and Exif information. Only one image or two or more images may be included in the image group.

Subsequently, the image display unit 32 displays at least a part of the images included in the image set on the display 38 according to the command to display the image. For example, the image display unit 32 displays the image included in the image set or the image included in the image group narrowed down by the image narrowing-down unit 30 on the display 38. The image display unit 32 can display the main tag information assigned to the image displayed on the display 38 in association with the image displayed on the display 38.

Subsequently, the image sharing unit 34 shares images between the first user and a second user.

The second user is any one user or a plurality of users other than the first user of all the users who use the image processing system 10. The image sharing unit 34 sets the image selected according to the command to select the image so as to publish the image to any user or so as not to publish the image to the public according to the command to set the image so as to publish the image or so as not to publish the image to the public. The image sharing unit 34 shares the image selected according to the command to select the image with only the sharing partner set according to the command to set the sharing partner according to the command to share the image.

Subsequently, the communication unit 36 is the communication device of the client 14, and transmits and receives various data items to and from the communication device of the server 12.

For example, the communication unit 36 uploads the image (image data) stored in the storage device of the client 14 to the server 12 from the client 14 via the network 16, and downloads the image stored in the storage device of the server 12, which is configured such as HDD (Hard disc drive), to the client 14 from the server 12 via the network 16.

Figure 4:
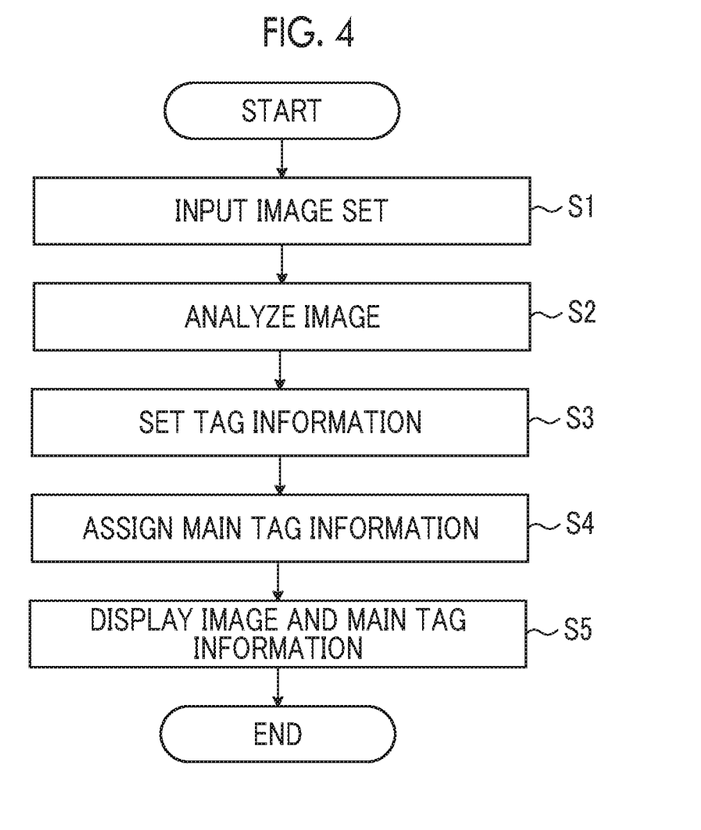
FIG. 4 is a flowchart of an embodiment showing an operation of the image processing system in a case where main tag information is assigned to an image included in an image set.

Next, an operation of the image processing system 10 in a case where the main tag information is assigned to the image included in the image set will be described with reference to a flowchart shown in FIG. 4.

In the client 14 owned by the first user, the image receiving unit 20 initially receives an input of the image set owned by the first user according to the command to designate the image set (S1). The image set is stored in the storage device of the client 14. The image set is uploaded to the server 12 from the client 14 via the network 16, and are stored in the storage device of the server 12.

Subsequently, each image included in the image set is analyzed by the image analyzing unit 22 (S2).

Subsequently, the tag information setting unit 24 sets the tag information items to be assigned to each image based on the analyzing result of each image (S3).

Subsequently, the tag information assigning unit 26 assigns, as the main tag information, the tag information, among the tag information items to be assigned to the image, for which the ratio of the number of times of appearances to the total number of times of appearances is equal to or greater than the first threshold value and is equal to or less than the second threshold value, to the image, for each image (S4).

Accordingly, it is possible to assign the main tag information having high necessity for the first user to each image included in the image set in the image set owned by the first user.

Next, the assigning method of the main tag information using the tag information assigning unit 26 will be described.

In a case where there are two or more tag information items, among the tag information items to be assigned to the image, for which the ratio is equal to or greater than the first threshold value and is equal to or less than the second threshold value, the tag information assigning unit 26 can assign, as the main tag information, these two or more tag information items, to the image, for each image. For example, in a case where there are the tag information items of "train" and "4000 series train" for which the ratio is equal to or greater than the first threshold value and is equal to or less than the second threshold value, both the tag information items of "train" and "4000 series train" are assigned as the main tag information to the image.

In a case where a priority is given to the tag information having a higher abstraction degree, the tag information assigning unit 26 may assign, as the main tag information, the tag information assigning unit assigns, as the main tag information, only the tag information, of the two or more tag information items for which the ratio is equal to or greater than the first threshold value and is equal to or less than the second threshold value, of which the abstraction degree is the maximum, to the image. Similarly, in a case where there are the tag information items of "train" and "4000 series train" for which the ratio is equal to or greater than the first threshold value and is equal to or less than the second threshold value, the tag information assigning unit assigns, as the main tag information, only the tag information of "train" having a higher abstraction degree to the image.

Alternatively, in a case where a priority is given to the tag information having a lower abstraction degree, the tag information assigning unit 26 may assign, as the main tag information, only the tag information, of the two or more tag information items for which the ratio is equal to or greater than the first threshold value and is equal to or less than the second threshold value, of which the abstraction degree is the minimum, to the image. Similarly, in a case where there are the tag information items of "train" and "4000 series train" for which the ratio is equal to or greater than the first threshold value and is equal to or less than the second threshold value, the tag information assigning unit assigns, as the main tag information, only the tag information of "4000 series train" having a lower abstraction degree to the image.

Meanwhile, in a case where there is no tag information, among the tag information items to be assigned to the image, for which the ratio is equal to or greater than the first threshold value and is equal to or less than the second threshold value, the tag information assigning unit 26 may assign, as the main tag information, only the tag information, among the tag information items for which the ratio is less than the first threshold value, of which the ratio is the maximum, to the image, for each image. That is, among the tag information items for which the tag information is less than the first threshold value, the tag information assigning unit assigns, as the main tag information, to the image, the tag information having a higher ratio, that is, the tag information having a higher degree of interest to the first user.

Immediately after the input of the image set is received by the image receiving unit 20, the analysis of the image, the setting of the tag information, and the assignment of the tag information may be performed. Alternatively, after the input of the image set is received by the image receiving unit 20, the analysis of the image, the setting of the tag information, and the assignment of the tag information may be performed for a period for which any processing is not performed by the image processing system 10, for example, in the nighttime. The input of not only the image set owned by the first user but also the image sets owned by two or more users who use the image processing system 10 may be received, and the analysis of the image, the setting of the tag information, and the assignment of the main tag information may be performed in the image sets owned by two or more users.

Here, it is considered that there are a smaller number of images to which the tag information for which the ratio is less than the first threshold value is assigned and these images are the images having a lower degree of interest to the first user among the image sets. Accordingly, there is a low necessity to assign, as the main tag information, the tag information for which the ratio is less than the first threshold value to the image.

Meanwhile, it is considered that there are a large number of images to which the tag information for which the ratio exceeds the second threshold value is assigned and these images are the images having a higher degree of interest to the first user among the image set. However, since it is already considered to be known to the first user that the tag information for which the ratio exceeds the second threshold value is assigned to a large number of images and there are a large number of images to which the tag information for which the ratio exceeds the second threshold value is assigned, there is a low necessity to assign, as the main tag information, the tag information for which the ratio exceeds the second threshold value to the image.

For example, in a case where only an image of "vehicle" is included in the image set owned by the first user, it is known to the first user that each image is the image of "vehicle", and there is a low necessity to assign, as the main tag information, the tag information of "vehicle" to the image. In other words, there is a high necessity to assign, as the main tag information, the tag information of "train" or "4000 series train" other than "vehicle" to the image for the first user.

It is considered that the image to which the tag information for which the ratio is equal to or greater than the first threshold value and is equal to or less than the second threshold value is assigned is the image a higher degree of interest to the first user among the image set. Since it is considered not to be known to the first user that there is the image to which the tag information for which the ratio is equal to or greater than the first threshold value and is equal to or less than the second threshold value is assigned, the tag information for which the ratio is equal to or greater than the first threshold value and is equal to or less than the second threshold value is set as the main tag information, and thus, it is possible to assign the main tag information having a high necessity for the first user to the image.

For example, in a case where only the image of "vehicle" is included in the image set owned by the first user, it is assumed that the ratio of the tag information of "vehicle" exceeds the second threshold value, the ratio of the tag information of "train" is equal to or greater than the first threshold value and is equal to or less than the second threshold value, and the ratio of the tag information of "4000 series train" is less than the first threshold value. In this case, the tag information of "train" is assigned as the main tag information to the image, and thus, it is possible to assign the main tag information having a higher necessity for the first user to the image.

In the present embodiment, the tag information setting unit 24 sets, as the tag information items to be assigned to the image, two or more tag information items which have different abstraction degrees, among the plurality of tag information items which is included in the same category and has different abstraction degrees, for each image. In this case, the tag information assigning unit 26 assigns, as the main tag information, the tag information, of two or more tag information items which are to be assigned to the image and have different abstraction degrees, for which the ratio of the number of times of appearances to the total number of times of appearances is equal to or greater than the first threshold value and is equal to or less than the second threshold value, to the image. That is, the tag information setting unit 24 sets the tag information items to be assigned to each image, among the plurality of tag information items which is prepared in advance in the image processing system 10 and has different abstraction degrees for each category.

Accordingly, it is possible to assign the main tag information having an appropriate abstraction degree to each image included in the image set in the image set owned by the first user.

Subsequently, the image display unit 32 displays the image included in the image set on the display 38 according to the command to display the image, and displays the main tag information assigned to the image in association with the image displayed on the display 38 (S5).

Accordingly, the first user can display the image included in the image set on the display 38, and can confirm the image displayed on the display 38 and the main tag information having an appropriate abstraction degree assigned to the image.

Figure 5:
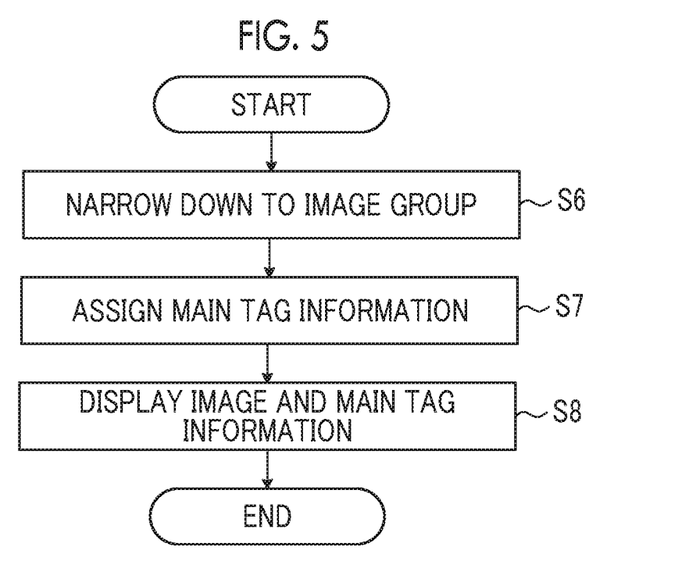
FIG. 5 is a flowchart of an embodiment showing an operation of the image processing system in a case where the image set is narrowed down to an image group.

Next, an operation of the image processing system 10 in a case where the images included in the image set are narrowed down to the image group will be described with reference to a flowchart shown in FIG. 5.

In this case, the image narrowing-down unit 30 narrows down the images included in the image set to the image group matching the narrowing-down condition according to the command to set the narrowing-down condition of the images (S6).

Subsequently, the tag information assigning unit 26 assigns, as the main tag information, the tag information, among the tag information items to be assigned to the image, for which the ratio of the number of times of appearances of the tag information to be assigned to the image to the total number of times of appearances of all the tag information items to be assigned to all the images included in the image group is equal to or greater than the third threshold value and is equal to or less than the fourth threshold value, to the image, for each image included in the image group (S7).

Accordingly, it is possible to assign the main tag information having a high necessity for the first user to each image included in the image group in the narrowed-down image group.

The third threshold value and the fourth threshold value used in the image group correspond to the first threshold value and the second threshold value used in the image group. As stated above, in a case where a population of the images used at the time of assigning the main tag information is changed, the threshold value may be changed according to the population. In a case where the population of the images used at the time of assigning the main tag information is changed, the tag information assigned to each image is also changed as the main tag information.

Subsequently, the image display unit 32 displays the image included in the image group narrowed down by the image narrowing-down unit 30 on the display 38, and displays the main tag information assigned to the image in association with the image displayed on the display 38 (S8).

Accordingly, the first user can display the image included in the image group narrowed down by the narrowing-down condition on the display 38, and can confirm the image displayed on the display 38 and the main tag information having an appropriate abstraction degree assigned to the image. Although not shown, in a case where the first user selects and views one image displayed on the display 38, since it is considered that a display space relatively remains on the display 38, it is preferable that other all tag information items are displayed in addition to the main tag information.

Figure 6:
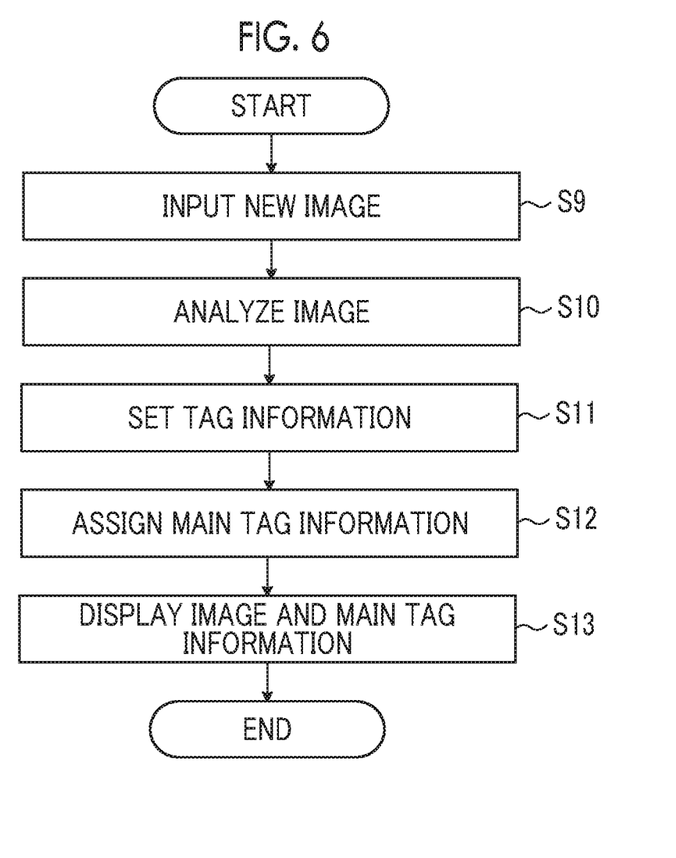
FIG. 6 is a flowchart of an embodiment showing an operation of the image processing system in a case where a new image is input.

Next, an operation of the image processing system 10 in a case where a new image is input will be described with reference to a flowchart shown in FIG. 6.

In this case, the image receiving unit 20 receives an input of the new image, and adds the new image to the image set owned by the first user (S9).

Subsequently, the image analyzing unit 22 analyzes the new image (S10).

Subsequently, the tag information setting unit 24 sets tag information items to be assigned to the new image based on an analyzing result of the new image (S11).

Subsequently, the tag information assigning unit 26 assigns, as the main tag information, the tag information, among the tag information items to be assigned to the image, for which the ratio of the number of times of appearances to the total number of times of appearances is equal to or greater than the first threshold value and is equal to or less than the second threshold value, to the image, for each image included in the image set which includes the new image and is owned by the first user (S12).

In a case where the new image is input, since the population of the images used at the time of assigning the main tag information is changed, the tag information to be assigned to each image is also changed as the main tag information. For example, in a case where a hobby of the first user is "train", there are many images of "train", but the hobby is changed to "plane", a percentage of the images of "plane" occupying the image set is gradually increased. Accordingly, the tag information to be assigned as the main tag information to each image is also changed.

Subsequently, the image display unit 32 displays the image included in the image set which includes the new image and is owned by the first user on the display 38, and displays the main tag information assigned to the image in association with the image displayed on the display 38 (S13).

Accordingly, the first user can display the image included in the image set which includes the new image and is owned by the first user on the display 38, and can confirm the image displayed on the display 38 and the main tag information having an appropriate abstraction degree assigned to the image.

In the image processing system 10, the first user and the second users may share the image by the image sharing unit 34.

For example, in a case where images owned by the second user are shared with the first user, the image receiving unit 20 can add the shared images as the image set owned by the first user. In this case, the shared images are also similarly used as the image set owned by the first user, and the processing such as the analysis of the image, the setting of the tag information, the assignment of the main tag information, and the display of the image and the main tag information is performed.

Accordingly, the first user can display the image included in the image set which includes the shared images and is owned by the first user on the display 38, and can confirm the image displayed on the display 38 and the main tag information having an appropriate abstraction degree assigned to the image.

The image processing device according to the embodiment of the present invention may not be realized by only the client 14. The server 12 may comprise one or more components of a plurality of components of the client 14.

In the device according to the embodiment of the present invention, a hardware configuration of a processing unit that performs various processing of the command obtaining unit 18, the image receiving unit 20, the image analyzing unit 22, the tag information setting unit 24, the tag information assigning unit 26, the abstraction degree setting unit 28, the image narrowing-down unit 30, the image display unit 32, the image sharing unit 34, and the communication unit 36 may be dedicated hardware, or may be various processors or computers that perform programs, which is store in a recording medium.

Various processors include a central processing unit (CPU) which is a general purpose processor functioning as various processing units by executing software (program), a programmable logic device (PLD) which is a processor capable of changing a circuit configuration after a field programmable gate array (FPGA) is manufactured, and a dedicated electric circuit which is a processor having a circuit configuration designed as a dedicated circuit in order to perform specific processing such as application specific integrated circuit (ASIC).

One processing unit may be constituted by one of the various processors. One processing unit may be obtained by combining the same kind or different kinds of two or more processors, for example, by combining a plurality of FPGAs, or may be obtained by combining the FPGA and the CPU. The plurality of processing units may be constituted by one of the various processors or may be constituted by using one processor obtained by combining two or more of the plurality of processing units.

For example, one processor is constituted by combining one or more CPUs and software so as to be represented by the computers such as the server and the client, and this processor functions as the plurality of processing units. A processor that realizes the functions of the entire system including the plurality of processing units by using one integrated circuit (IC) chip is used so as to be represented by a system on chip (SoC).

More specifically, the hardware configuration of these various processors is an electric circuitry obtained by combining circuit elements such as semiconductor elements.

For example, a method according to the embodiment of the present invention can be implemented by a program causing a computer to execute steps. It is possible to provide a computer-readable recording medium having the program recorded thereon.

While the present invention has been described in detail, the present invention is not limited to the embodiment, and may be modified and change in various manners without departing the gist of the present invention.

EXPLANATION OF REFERENCES

10: image processing system
12: server
14: client
16: network
18: command obtaining unit
20: image receiving unit
22: image analyzing unit
24: tag information setting unit
26: tag information assigning unit
28: abstraction degree setting unit
30: image narrowing-down unit
32: image display unit
34: image sharing unit
36: communication unit
38: display

What is claimed is:

1. An image processing device comprising:
an image receiving unit that receives an input of an image set owned by a first user;
an image analyzing unit that analyzes each image included in the image set;
a tag information setting unit that sets tag information items to be assigned to each image based on analyzing result of each image;
a tag information assigning unit that assigns, as main tag information, the tag information, among the tag information items to be assigned to the image, for which a ratio of the number of times of appearances of the tag information to be assigned to the image to the total number of times of appearances of all the tag information items to be assigned to all the images included in the image set is equal to or greater than a first threshold value and is equal to or less than a second threshold value, to the image, for each image; and
an abstraction degree setting unit that sets abstraction degrees of the tag information items assigned to each image based on the tag information items assigned to the images included in the image set,
wherein the tag information setting unit sets, as the tag information items to be assigned to the image, two or more tag information items which have different abstraction degrees, among a plurality of tag information items which is included in the same category and has different abstraction degrees, for each image,
the tag information assigning unit assigns, as the main tag information, tag information, among the two or more tag information items which are to be assigned to the image and have different abstraction degrees, for which the ratio is equal to or greater than the first threshold value and is equal to or less than the second threshold value, to the image,
in a case where first tag information and second tag information are tag information items included in the same category and the second tag information is assigned to the image to which the first tag information is assigned and the first tag information is not assigned to the image to which the second tag information is assigned is equal to or greater than a threshold value, the abstraction degree setting unit performs setting such that the abstraction degrees of the first tag information and the second tag information are different and the abstraction degree of the second tag information is higher than the abstraction degree of the first tag information, and
the tag information setting unit sets the tag information items to be assigned to each image by using the tag information items which are assigned to the images included in the image set and for which the abstraction degrees are set, as the plurality of tag information items having different abstraction degrees.

2. The image processing device according to claim 1, wherein, in a case where there are two or more tag information items, among the tag information items to be assigned to the image, for which the ratio is equal to or greater than the first threshold value and is equal to or less than the second threshold value, the tag information assigning unit assigns, as the main tag information, the two or more tag information items for which the ratio is equal to or greater than the first threshold value and is equal to or less than the second threshold value, to the image, for each image.

3. The image processing device according to claim 1, wherein, in a case where there are two or more tag information items, among the tag information items to be assigned to the image, for which the ratio is equal to or greater than the first threshold value and is equal to or less than the second threshold value, the tag information assigning unit assigns, as the main tag information, only the tag information, of the two or more tag information items for which the ratio is equal to or greater than the first threshold value and is equal to or less than the second threshold value, of which the abstraction degree is the maximum, to the image, for each image.

4. The image processing device according to claim 1, wherein, in a case where there are two or more tag information items, among the tag information items to be assigned to the image, for which the ratio is equal to or greater than the first threshold value and is equal to or less than the second threshold value, the tag information assigning unit assigns, as the main tag information, only the tag information, of the two or more tag information items for which the ratio is equal to or greater than the first threshold value and is equal to or less than the second threshold value, of which the abstraction degree is the minimum, to the image, for each image.

5. The image processing device according to claim 1, wherein, in a case where there is no tag information, among the tag information items to be assigned to the image, for which the ratio is equal to or greater than the first threshold value and is equal to or less than the second threshold value, the tag information assigning unit assigns, as the main tag information, only the tag information, among the tag information items for which the ratio is less than the first threshold value, of which the ratio is the maximum, to the image, for each image.

6. The image processing device according to claim 1, further comprising:
an image narrowing-down unit that narrows down the images included in the image set to an image group matching a narrowing-down condition according to a command to set the narrowing-down condition of the images,
wherein the tag information assigning unit assigns, as the main tag information, the tag information, among the tag information items to be assigned to the image, for which a ratio of the number of times of appearances of the tag information to be assigned to the image to the total number of times of appearances of all the tag information items to be assigned to all the images included in the image group is equal to or greater than a third threshold value and is equal to or less than a fourth threshold value, to the image, for each image included in the image group.

7. The image processing device according to claim 1,
wherein the image receiving unit receives an input of a new image owned by the first user, and adds the new image to the image set,
the image analyzing unit analyzes the new image,
the tag information setting unit sets tag information items to be assigned to the new image based on an analyzing result of the new image, and
the tag information assigning unit assigns, as the main tag information, the tag information, among the tag information items to be assigned to the image, for which the ratio is equal to or greater than the first threshold value and is equal to or less than the second threshold value, to the image, for each image included in the image set including the new image.

8. The image processing device according to claim 1, further comprising:
an image sharing unit that shares an image between the first user and the second user,
wherein, in a case where an image owned by the second user is shared with the first user, the image receiving unit adds the shared image as the image set owned by the first user.

9. The image processing device according to claim 1, further comprising:
an image display unit that displays at least a part of the images included in the image set on a display,
wherein the image display unit displays the main tag information assigned to the image displayed on the display in association with the image displayed on the display.

10. The image processing device according to claim 1,
wherein the tag information setting unit sets, as the tag information items to be assigned to each image, tag information indicating an emotion of a person appearing in each image.

11. The image processing device according to claim 1,
wherein the tag information setting unit sets, as the tag information items to be assigned to each image, tag information indicating an emotion of a person who captures each image according to a command to set an emotion of a photographer.

12. The image processing device according to claim 1,
wherein the tag information assigning unit assigns tag information, among the tag information items to be assigned to the image, which is other than the tag information assigned as the main tag information to the image, to the image, for each image.

13. An image processing method comprising:
receiving, by an image receiving unit, an input of an image set owned by a first user;
analyzing, by an image analyzing unit, each image included in the image set;
setting, by a tag information setting unit, tag information items to be assigned to each image based on an analyzing result of each image;
assigning, by a tag information assigning unit, as main tag information, tag information, among the tag information items to be assigned to the image, for which a ratio of the number of times of appearances of the tag information to be assigned to the image to the total number of times of appearances of all the tag information items to be assigned to all the images included in the image set is equal to or greater than a first threshold value and is equal to or less than a second threshold value, to the image, for each image; and
setting, by an abstraction degree setting unit, abstraction degrees of the tag information items assigned to each image based on the tag information items assigned to the images included in the image set,
wherein two or more tag information items which have different abstraction degrees, among a plurality of tag information items which is included in the same category and has different abstraction degrees are set as the tag information items to be assigned to the image for each image,
the tag information, of the two or more tag information items which are to be assigned to the image and have different abstraction degrees, for which the ratio is equal to or greater than the first threshold value and is equal to or less than the second threshold value, is assigned as the main tag information to the image,
in a case where first tag information and second tag information are tag information items included in the same category and the second tag information is assigned to the image to which the first tag information is assigned and the first tag information is not assigned to the image to which the second tag information is assigned is equal to or greater than a threshold value, the abstraction degrees are set such that the abstraction degrees of the first tag information and the second tag information are different and the abstraction degree of the second tag information is higher than the abstraction degree of the first tag information, and
the tag information items to be assigned to each image are set as the plurality of tag information items having different abstraction degrees by using the tag information items which are assigned to the images included in the image set and for which the abstraction degrees are set.

14. The image processing method according to claim 13, further comprising:
narrowing down, by an image narrowing-down unit, the images included in the image set to an image group matching a narrowing-down condition according to a command to set the narrowing-down condition of the images,
wherein the tag information, among the tag information items to be assigned to the image, for which a ratio of the number of times of appearances of the tag information to be assigned to the image to the total number of times of appearances of all the tag information items to be assigned to all the images included in the image group is equal to or greater than a third threshold value and is equal to or less than a fourth threshold value, is assigned as the main tag information to the image, for each image included in the image group.

15. The image processing method according to claim 13, further comprising:

receiving, by the image receiving unit, an input of a new image owned by the first user, and adding the new image to the image set;

analyzing, by the image analyzing unit, the new image; and setting, by the tag information setting unit, tag information items to be assigned to the new image based on an analyzing result of the new image, wherein the tag information, among the tag information items to be assigned to the image, for which the ratio is equal to or greater than the first threshold value and is equal to or less than the second threshold value, is assigned as the main tag information to the image, for each image included in the image set including the new image.

16. The image processing method according to claim 13, further comprising:

displaying, by an image display unit, at least a part of the images included in the image set on a display, wherein the main tag information assigned to the image displayed on the display is displayed in association with the image displayed on the display.

17. A non-transitory computer-readable recording medium having a program causing a computer to execute the steps of the image processing method according to claim 13 recorded thereon.

18. An image processing device comprising:

a processor configured to, receive an input of an image set owned by a first user;

analyze each image included in the image set;

set tag information items to be assigned to each image based on analyzing result of each image;

assign, as main tag information, the tag information, among the tag information items to be assigned to the image, for which a ratio of the number of times of appearances of the tag information to be assigned to the image to the total number of times of appearances of all the tag information items to be assigned to all the images included in the image set is equal to or greater than a first threshold value and is equal to or less than a second threshold value, to the image, for each image; and set abstraction degrees of the tag information items assigned to each image based on the tag information items assigned to the images included in the image set, wherein two or more tag information items which have different abstraction degrees, among a plurality of tag information items which is included in the same category and has different abstraction degrees are set as the tag information items to be assigned to the image for each image, the tag information, of the two or more tag information items which are to be assigned to the image and have different abstraction degrees, for which the ratio is equal to or greater than the first threshold value and is equal to or less than the second threshold value, is assigned as the main tag information to the image, in a case where first tag information and second tag information are tag information items included in the same category and the second tag information is assigned to the image to which the first tag information is assigned and the first tag information is not assigned to the image to which the second tag information is assigned is equal to or greater than a threshold value, the abstraction degrees are set such that the abstraction degrees of the first tag information and the second tag information are different and the abstraction degree of the second tag information is higher than the abstraction degree of the first tag information, and the tag information items to be assigned to each image are set as the plurality of tag information items having different abstraction degrees by using the tag information items which are assigned to the images included in the image set and for which the abstraction degrees are set.

* * * * *